United States Patent [19]
Acevedo et al.

[11] Patent Number: 5,891,518
[45] Date of Patent: Apr. 6, 1999

[54] CARBON FIBER-COATING PRODUCED VIA PRECURSOR/SOLVENT SOLUTION

[75] Inventors: Joaquin Ricardo Acevedo, Westminster; David Eric Daws, Los Alamitos, both of Calif.

[73] Assignee: Northrop Grumman Corporation, Los Angeles, Calif.

[21] Appl. No.: 792,825

[22] Filed: Jan. 30, 1997

[51] Int. Cl.$^6$ ........................................................ B05D 3/02
[52] U.S. Cl. ..................... 427/228; 427/389.9; 427/389.8
[58] Field of Search ..................................... 427/228, 299, 427/389.9, 389.8

[56] References Cited

U.S. PATENT DOCUMENTS

| | | | |
|---|---|---|---|
| 3,533,825 | 10/1970 | Bohrer et al. | 117/29 |
| 3,854,979 | 12/1974 | Rossi | 117/46 CC |
| 3,908,061 | 9/1975 | Byrne et al. | 428/208 |
| 4,024,226 | 5/1977 | Lersmacher et al. | 423/449 |
| 4,816,338 | 3/1989 | Terasaki et al. | 428/408 |
| 4,842,933 | 6/1989 | Cizmecioglu | 428/378 |
| 5,039,635 | 8/1991 | Stempin et al. | 501/95 |
| 5,258,084 | 11/1993 | Leung et al. | 156/89 |
| 5,266,533 | 11/1993 | Leung et al. | 501/12 |
| 5,322,555 | 6/1994 | Leung et al. | 106/18.12 |
| 5,334,414 | 8/1994 | Edie et al. | 427/189 |
| 5,340,777 | 8/1994 | Leung et al. | 501/12 |

*Primary Examiner*—Christopher Raimund
*Attorney, Agent, or Firm*—Terry J. Anderson; Karl J. Hoch, Jr.

[57] ABSTRACT

The present invention is a low cost carbon fiber-coating produced via a precursor/solvent solution and the methods and processes for fabricating such a carbon fiber-coating. The carbon fiber-coating comprises a fibrous substrate or fabric material and a carbon coating. The carbon coating prior to carbonization, is comprised of a coating solution made of a precursor dissolved directly within a solvent. Fabrication is achieved by first desizing the fibrous substrate, second immersing the desized fibrous substrate in the coating solution, third evaporating the solvent and curing the precursor via a low temperature pyrolysis in preferably an inert atmosphere, and fourth carbonizing the coating via a high temperature pyrolysis. These steps can be repeated as necessary, depending on the desired final thickness of the carbon coating. Multiple applications of the carbon coating can be used to provide limitless final coating thickness.

15 Claims, 2 Drawing Sheets

CARBON FIBER-COATING PRODUCED VIA PRECURSOR/SOLVENT SOLUTION

BACKGROUND OF THE INVENTION

1. Field of the Invention

The present invention relates in general to carbon coatings, and in particular to a low cost carbon fiber-coating produced via a precursor/solvent solution and the methods and processes for fabricating such a carbon fiber-coating.

2. Related Art

Tailored-conductivity fiber coatings are useful for many applications such as electromagnetic interference/radio frequency interference (EMI/RFI) shielding, static dissipation materials, and conductivity-tailoring of fiber-reinforcement for low observable applications. For lower temperature applications, such as tailored conductivity shielding applications, carbon is a very desirable fiber coating because of the relative ease of application, via chemical vapor deposition (CVD), and its availability. Also, carbon is a very desirable conductive coating because of its availability, resistance to environmental degradation, and low toxicity.

Also, interfacial coatings are very desirable for use with ceramic matrix composites (CMC's). For example, CMC's are useful for many applications because they possess high-temperature mechanical performance and exhibit a high strain-to-failure compared to monolithic ceramics. In order to achieve high strains-to-failure, many CMC systems require the interfacial coating between the fibrous reinforcement material and the ceramic matrix. The interfacial coating provides a weak bond between the fiber and matrix that allows fiber "pullout" (ductile shear movement instead of brittle fracture) during tensile stress application. In other words, the interfacial coating creates a weak disbond layer between the ceramic matrix and fibers, thereby imparting desired ductile qualities to the final CMC.

However, parts or fabrics that are coated via CVD, sputtering, or evaporation are limited in size to the internal capacity of the CVD furnace or sputtering/evaporation chamber. Also, coating uniformity is usually difficult to achieve due to line-of-sight masking during coating application. In addition, current methods for application of conductive coatings onto normally non-conductive fibers (for example, oxide ceramic fibers, such as Nextel, or fiberglass fibers) is often expensive and/or complex, such as sputtering or chemical vapor deposition (CVD). Further, the materials used for conductive coatings are often hazardous (such as chrome-silicide and titanium silicide), degrade via oxidation or moisture attack (such as nickel-based coatings), or are exorbitantly expensive (such as gold coatings).

As a result, the excess cost of the application techniques or inability to apply uniform coatings prevents the use of CMC's or conductive carbon coatings in low-cost, high volume applications, such as for the production of parts for the automotive industry or tailored-conductivity EMI/RFI shielding applications.

Therefore, what is needed is a low cost carbon coating application process capable of enabling tailored-conductivity fabric materials and/or CMC materials to compete effectively against other low-cost materials. What is also needed is a method to apply low-cost carbon coatings with inexpensive raw materials, low labor involvement, part size limited only by the capacity of the pyrolysis furnace, and improved coating uniformity.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is a low cost carbon fiber-coating produced via a precursor/solvent solution and the methods and processes for fabricating such a carbon fiber-coating.

The carbon fiber-coating comprises a fibrous substrate or fabric material and a carbon coating. The carbon coating prior to carbonization, is comprised of a coating solution made of a precursor dissolved directly within a solvent. Fabrication is achieved by first desizing the fibrous substrate, second immersing the desized fibrous substrate in the coating solution, third evaporating the solvent and curing the precursor via a low temperature cure, and fourth carbonizing the coating via a high temperature pyrolysis preferably in an inert atmosphere. These steps can be repeated as necessary, depending on the desired final thickness of the carbon coating. Multiple applications of the carbon coating can be used to provide limitless final coating thickness.

A feature of the present invention is that a uniform solidified coating exists around the substrate fibers. Another feature of the present invention is that the precursor of the coating solution (pre-carbonized solution) is dissolved directly within the solvent. Another feature of the present invention is that the final coating thickness can be varied. An advantage of the present invention is that coating uniformity is enhanced over CVD processing. Other advantages of the present invention are the low cost of raw materials, low labor intensity, and elimination of the need for expensive CVD equipment.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
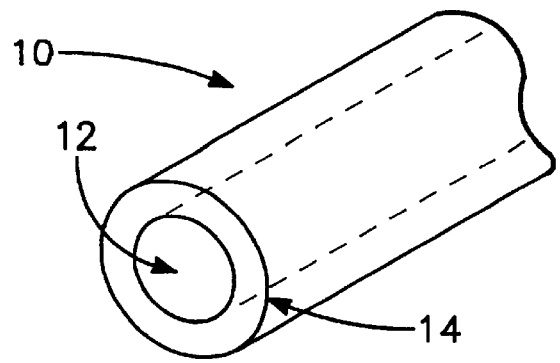
FIG. 1 is a perspective view of one example carbon fiber-coating of the present invention.

Overview:

FIG. 1 is a perspective view of the present invention. The present invention is a carbon-coated fiber 10 comprising a fibrous substrate or fabric material 12 and a carbon coating 14. The fibrous substrate 12 can be any fibrous material or sheet capable of enduring the fabrication process detailed below, which includes fiberglass, quartz, Nomex (organic fibers combined with an organic sheet), and most ceramic fibers.

The carbon coating 14, prior to carbonization, is preferably comprised of a coating solution made of 10% polyvinylchloride (PVC) precursor and 90% butanone (xylene with 10–20% methyl ethyl ketone) solvent. Other coating solutions can be made of 10% PVC precursor and 80% 2-butanone (MEK) and 10% xylene solvent. The precursor of the coating solution (pre-carbonized solution) is dissolved directly within the solvent.

Figure 2:
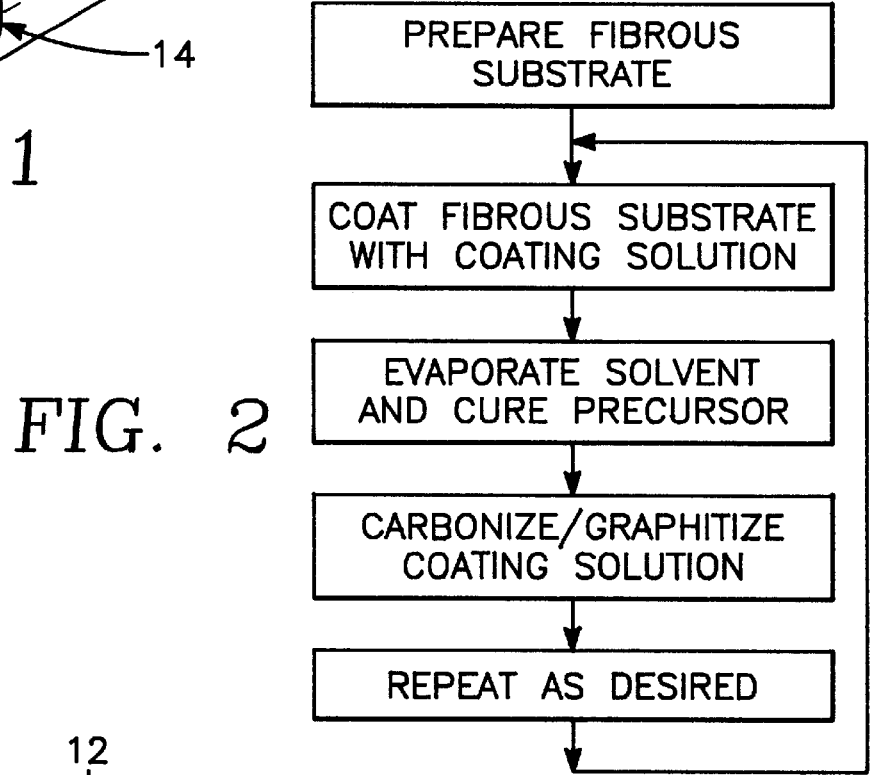
FIG. 2 is a flow chart illustrating the general steps for fabricating the carbon fiber-coating in accordance with the present invention.

FIG. 2 is a flow chart illustrating the general steps for fabricating the carbon fiber-coating in accordance with the present invention. First, a fibrous substrate (fabric or sheet material) is initially prepared. Initial preparation can include, for example, removing the protective fabric sizing (desizing) via a high temperature heat clean or immersing the fibrous substrate in an appropriate desizing solvent. Desizing the fibrous substrate is required to prevent the sizing from interfering with effective application, wetting, and adherence of the PVC-carbon coating to the substrate. This is important to ensure a uniform coating after completion of processing.

Figure 3:
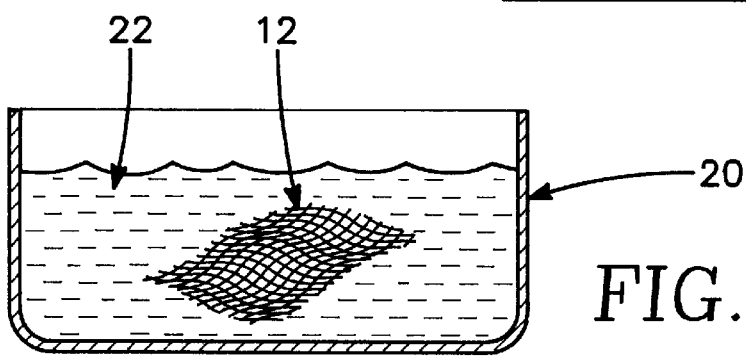
FIG. 3 is a cross-sectional side view of the present invention during one of the processing steps.

Second, the fibrous substrate is coated with a coating solution, such as the PVC precursor/butanone solvent mixture. This is accomplished by preferably immersing the desized fiber substrate in the coating solution until complete wetting is achieved, as shown in FIG. 3. FIG. 3 is a cross-sectional side view of the desized fibrous substrate 12 during immersion within a container 20 having the coating solution 22. Complete wetting provides direct application of the coating solution to the fibrous substrate. This is important because it ensures a uniform application around the substrate fibers.

Third, the solvent of the coating solution is evaporated and the precursor is cured. This step creates a uniform solidified coating around the fibers of the substrate. For example, a vacuum oven can be used at low temperatures to evaporate the solvent and cure the precursor. It should be noted that this curing step does not carbonize the precursor, but merely solidifies the precursor through cross-linking of the precursor polymer.

Figure 4:
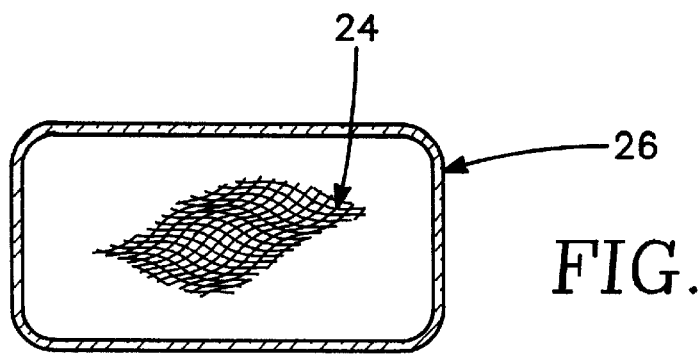
FIG. 4 is a cross-sectional side view of the present invention during one of the processing steps.
Figure 5:
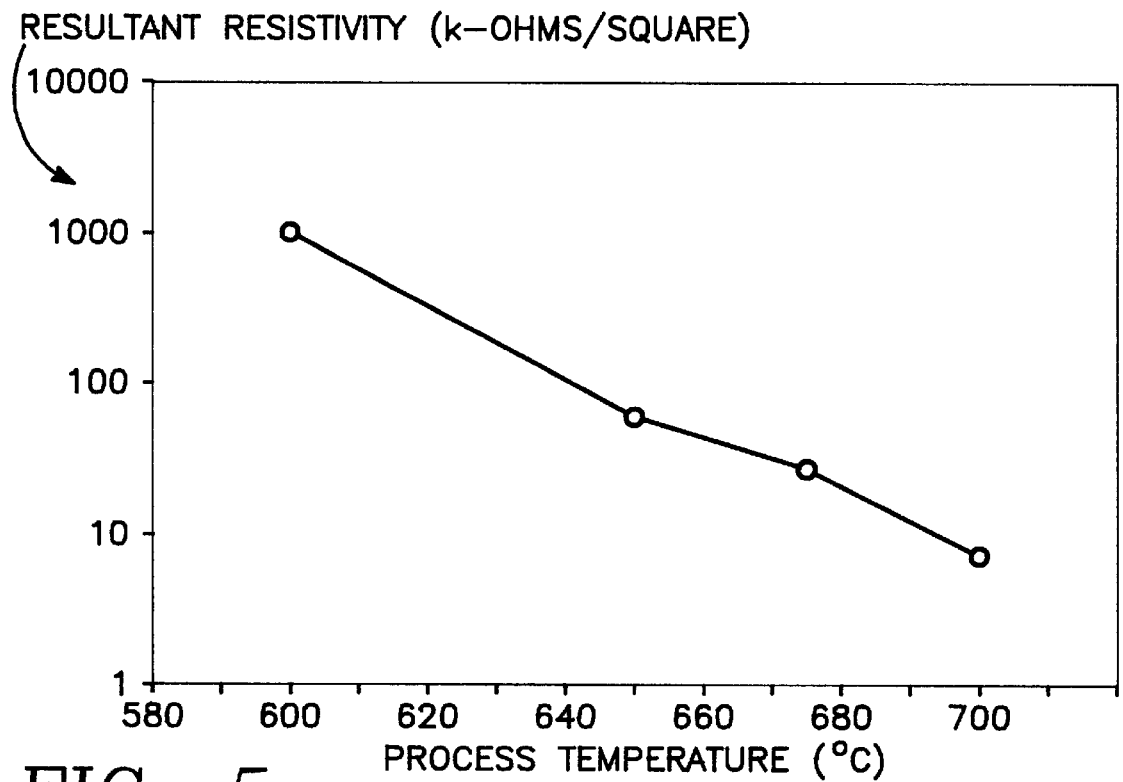
FIG. 5 illustrates resistivity as a function of carbonization process temperature.

Fourth, the uniform solidified coating around the fibrous substrate is carbonized/graphitized. Carbonization of the uniform solidified coating can be achieved via a high temperature pyrolysis with an inert atmosphere pyrolyzation process, as shown in FIG. 4. FIG. 4 is a cross-sectional side view of the fibrous coated substrate 24 during high heat treatment within a furnace 26. For effective carbonization of the PVC coating and to increase electrical conductivity the pyrolysis must be performed at 600 C. or above. FIG. 5 illustrates the resistivity as a function of pyrolysis process temperature for a one coating layer application on glass fabric. As shown in FIG. 5, increased conductivity is a function of coating thickness and pyrolysis temperature. This step converts the uniform solidified coating to a carbon coating. The second, third, and fourth steps can be repeated as necessary, depending on the desired thickness of the carbon coating (applications discussed below). Multiple applications of the carbon coating process embodied in the present invention can be used to provide limitless final coating thickness and resultant electrical conductivities.

Working Example:

One specific fabrication working example (not including Nomex) consists of the following steps:

1) Obtain suitable fibrous substrate/fabric material, such as Nextel 440 alumino-silicate fabric.

2) Remove any protective fabric sizing preferably via a high temperature heat clean or via immersion in an appropriate solvent.

3) Immerse fibrous substrate in a solution (comprising 10% polyvinylchloride (PVC) precursor and 90% butanone [xylene with 10–20% methyl ethyl ketone] solvent) until complete wetting is achieved to coat the fibrous substrate with the solution.

4) Evaporate solvent and solidify precursor via low temperature cure: Transfer the coated fibrous substrate to a vacuum oven and heat it for a time and at a temperature to initiate polymerization (for example, at 2.5 degrees C./minute to 175 degrees C.), then hold it for a time and at a temperature to achieve complete polymerization of the polymeric coating (for example, at 175 degrees C. for 30 minutes), all preferably under vacuum. Next, furnace cool the coated fibrous substrate, preferably back to room-temperature. Release vacuum after cooldown.

5) Convert coating precursor to carbon (carbonization) via high-temperature pyrolysis: Place coated fibrous substrate within a high-temperature furnace capable of maintaining an inert atmosphere during processing. Flow inert fluid (such as gas nitrogen or other suitable inert fluid) so that it fills the furnace, then heat the coated fibrous substrate for a time and at a temperature to form a carbon coating (for example, at 15 degrees C./minute to 200 degrees C. for 30 minutes). Continue heating the coated fibrous substrate for a time and at a temperature sufficient to form a carbon coating without damaging the fibrous substrate (for example, at 15 degrees C./minute to 900 degrees C. for 15 minutes). Cool furnace at the power-off rate. Keep the coated fibrous substrate within the inert environment until the temperature decreases to a temperature at which oxidation of the carbon coating will not occur (for example, cool it to at least 250 degrees C.).

6) Repeat steps 3–5 as necessary (depending on the desired carbon coating thickness).

This example will produce a carbon coating of approximately 0.25 $\mu$m thick per coating application.

Specific Working Example With Other Fibrous Substrates:

Some fibrous substrates, such as Nomex, are not amenable to processing above certain threshold temperatures, for instance 400 C., due to destruction of material properties. As such, an additional step is added before step 3. Namely, the PVC mixture is doped with a small percentage of carbon powder. The carbon portion acts as a conductive element in the final coating. The doped PVC mixture is then ball-milled for approximately 72 hours. This step makes the doped PVC mixture fine.

Next, the ball-milled fine mixture is applied to the Nomex preferably via spray application. The Nomex is then immersed in a solution comprising the polyvinylchloride precursor, butanone solvent, and the carbon powder until complete wetting is achieved so as to coat the Nomex with the solution. The coated Nomex is then cured in the vacuum oven as described above in step 4. It should be noted that step 5 is not performed for fibrous substrates not amenable to processing above certain threshold temperatures, such as Nomex.

Figure 6:
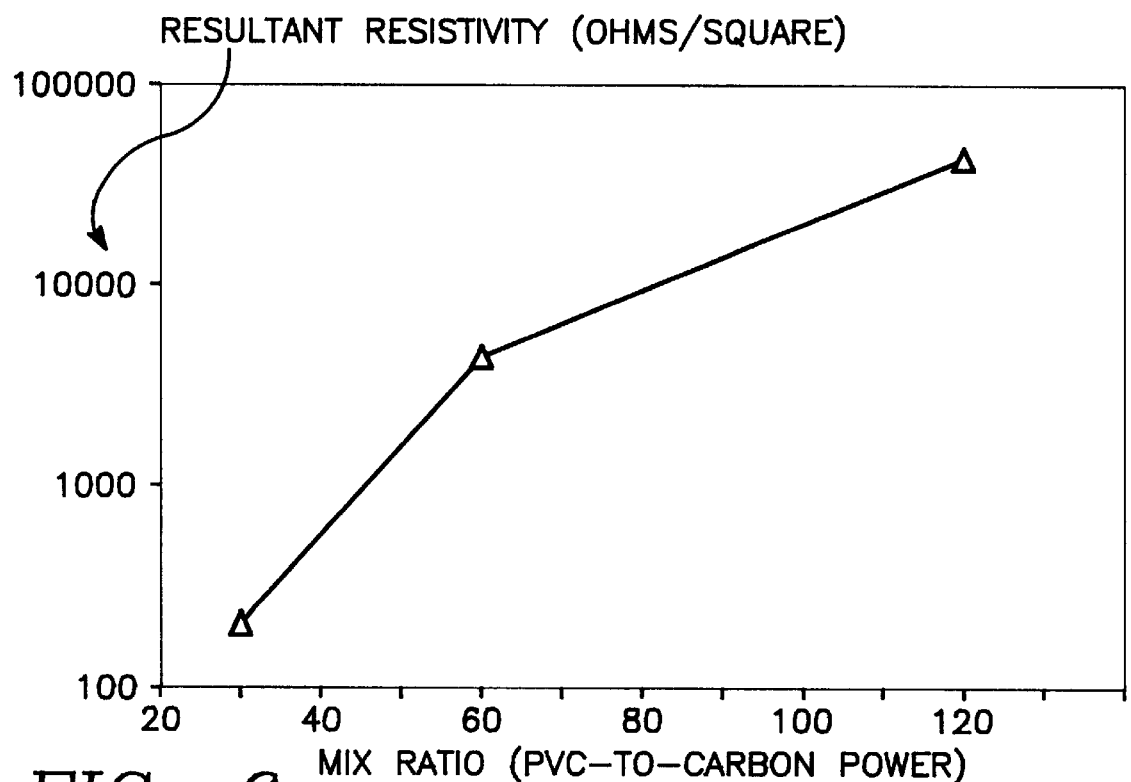
FIG. 6 illustrates resistivity as a function of carbon powder concentration.

Table I illustrates a mix ratio defined by the ratio of the PVC solution weight to the carbon powder weight with corresponding weight gain (final weight gain after coating) and conductivity. FIG. 6 illustrates resistivity as a function of carbon powder concentration.

TABLE I

| Mix Ratio: | 30 PVC: 1 carbon | 60 PVC: 1 carbon | 120 PVC: 1 carbon |
|---|---|---|---|
| Weight Gain: | 1.889 grams | 1.950 grams | 2.009 grams |
| Conductivity: | 200 Ohms/sq | 4200 Ohms/sq | 42000 Ohms/sq |

Application:

The carbon coating can be used for applications such as imparting electrical conductivity to fibers. The conductivity of the fibers can be tailored by varying the pyrolysis process temperature and/or the final carbon coating thickness. A thicker carbon coating creates a higher conductivity. Also, a higher pyrolysis temperature additionally produces a higher conductivity. In other words, conductivity is directly related to the pyrolysis process temperature and the thickness of the carbon coating.

For example, four-point probe testing has shown a resistance of 100 ohms/sq with a nominal coating thickness of 0.25 μm and at a pyrolysis process temperature of 900 C. after one application of the carbon coating on Nextel 440 fabric. As such, additional layers would further reduce resistivity. Thus, commercial applications such as low-cost electromagnetic interference (EMI) shielding panel materials can be fabricated in accordance with the carbon coating process embodied in the present invention within a low-cost fiber matrix, such as an organic-based polymer.

In addition, the carbon fiber-coating of the present invention can be used to apply a carbon fiber-coating for use within ceramic matrix composite parts (of most sizes limited only by the size of the furnace and immersion bath) in a cost effective manner. Any fibrous substrate with a surface that is non-reactive with the coating constituents and that can withstand the processing steps can be coated using the process embodied in the present invention. However, even lower temperature fibers, such as fiberglass, can be carbon fiber-coated in accordance with the present invention, for example, by lowering the pyrolysis temperature of step 5. For example, the low-cost process embodied in the present invention can be used for the application of carbon interfacial coatings as a fiber-matrix interfacial coating for CMC materials.

An advantage of the present invention is that coating uniformity is enhanced over CVD coating due to the complete immersion of the fibrous substrate during the solution coating process. Also, the low cost of raw materials, low labor intensity, and elimination of the need for expensive CVD equipment (limited only to the size of furnace and immersion bath) provides a superior coating process.

It should be noted that the above is an example set of steps for fabricating the carbon fiber-coating of the present invention. Other processes with modified steps suitable for effective fabrication can be used as long as no damage occurs to the either the coating solution or the fibrous substrate.

Accordingly, the foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of producing a carbon coated fibrous substrate material, the method comprising the sequential steps of:

a) substantially completely wetting a fibrous substrate material with a soaking liquid comprising a carbon-coat polymer precursor dissolved within a solvent;

b) maintaining the fibrous substrate material in the liquid for a time sufficient to effectuate a generally uniform coating of the polymer precursor on substantially all fibers of the fibrous substrate material;

c) removing the solvent from the fibrous substrate material;

d) curing the polymer precursor disposed on the fibers of the fibrous substrate material to a solidified non-carbonized state; and e) pyrolizing the fibrous substrate material to a carbonized state in a non-carbonizing atmosphere.

2. A method of producing a carbon coated fibrous substrate material as claimed in claim 1 wherein the polymer precursor is polyvinylchloride.

3. A method of producing a carbon coated fibrous substrate material as claimed in claim 2 wherein the soaking liquid comprises about 10% polyvinylchloride and about 90% of a mixture of about 80–90% xylene and 10–20% methyl ethyl ketone.

4. A method of producing a carbon coated fibrous substrate material as claimed in claim 1 wherein the fibrous substrate material is a fabric material or a sheet material.

5. A method of producing a carbon coated fibrous substrate material as claimed in claim 4 wherein the fibrous substrate material is chosen from the group consisting of fiberglass, quartz, and a fibrous ceramic matrix.

6. A method of producing a carbon coated fibrous substrate material as claimed in claim 1 wherein the fibrous substrate material is pyrolized in an inert atmosphere.

7. A method of producing a carbon coated fibrous substrate material, the method comprising the sequential steps of:

a) substantially completely wetting a fibrous substrate material with a soaking liquid comprising a carbon-coat polymer precursor dissolved within a solvent;

b) maintaining the fibrous substrate material in the liquid for a time sufficient to effectuate a generally uniform coating of the polymer precursor on substantially all fibers of the fibrous substrate material;

c) removing the solvent from the fibrous substrate material;

d) curing the polymer precursor disposed on the fibers of the fibrous substrate material to a solidified non-carbonized state;

e) pyrolizing the fibrous substrate material to a carbonized state in a non-carbonizing atmosphere; and f) repeating steps (a) through (e) at least once.

8. A method of producing a carbon coated fibrous substrate material as claimed in claim 7 wherein the polymer precursor is polyvinylchloride.

9. A method of producing a carbon coated fibrous substrate material as claimed in claim 8 wherein the soaking liquid comprises about 10% polyvinylchloride and about 90% of a mixture of about 80–90% xylene and 10–20% methyl ethyl ketone.

10. A method of producing a carbon coated fibrous substrate material as claimed in claim 7 wherein the fibrous substrate material is a fabric material or a sheet material.

11. A method of producing a carbon coated fibrous substrate material as claimed in claim 10 wherein the fibrous substrate material is chosen from the group consisting of fiberglass, quartz, and a fibrous ceramic matrix.

12. A method of producing a carbon coated fibrous substrate material as claimed in claim 7 wherein the fibrous substrate material is pyrolized in an inert atmosphere.

13. A method of producing a carbon coated fibrous substrate material, the method comprising the sequential steps of:
   a) applying a mixture of polyvinylchloride and carbon powder to a fibrous substrate material, said mixture being from about 30 parts to about 120 parts by weight polyvinylchloride to one part by weight carbon powder;
   b) substantially completely wetting the fibrous substrate material with a soaking liquid comprising a carbon-coat polymer precursor dissolved within a solvent;
   c) maintaining the fibrous substrate material in the liquid for a time sufficient to effectuate a generally uniform coating of the polymer precursor on substantially all fibers of the fibrous substrate material;
   d) removing the solvent from the fibrous substrate material; and
   e) curing the polymer precursor disposed on the fibers of the fibrous substrate material to a solidified non-carbonized state.

14. A method of producing a carbon coated fibrous substrate material as claimed in claim 13 wherein the polymer precursor is polyvinylchloride.

15. A method of producing a carbon coated fibrous substrate material as claimed in claim 13 wherein the fibrous substrate material is a fabric material or a sheet material.

* * * * *